US007626776B2

(12) United States Patent
Honma et al.

(10) Patent No.: US 7,626,776 B2
(45) Date of Patent: Dec. 1, 2009

(54) CAMERA MODULE

(75) Inventors: Toshihiko Honma, Yamagata (JP); Masayuki Itagaki, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 12/017,546

(22) Filed: Jan. 22, 2008

(65) Prior Publication Data
US 2008/0174890 A1    Jul. 24, 2008

(30) Foreign Application Priority Data
Jan. 24, 2007    (JP) ............................. 2007-014336

(51) Int. Cl.
*G02B 7/02*    (2006.01)
(52) U.S. Cl. .................................................... 359/824
(58) Field of Classification Search .......... 359/811–826
See application file for complete search history.

(56) References Cited
U.S. PATENT DOCUMENTS
5,636,068 A * 6/1997 Tanaka ....................... 359/814
7,440,201 B2 * 10/2008 Tsuruta et al. .............. 359/824

* cited by examiner

*Primary Examiner*—Scott J Sugarman
*Assistant Examiner*—Vipin M Patel
(74) *Attorney, Agent, or Firm*—Marger Johnson & McCollom, P.C.

(57) ABSTRACT

A camera module which can switch a photographing mode of the camera module includes a housing, a holder having a lens unit and displaceable between a first position and a second position, a magnetic member and a coil, a first magnet having an N pole, and a second magnet having an S pole. Positive DC supplied to the coil magnetizes the magnetic member to an N polarity repelled by the N pole and attracted to the S pole and held at that position by stopping the current for macro photographing mode. Negative DC supplied to the coil magnetizes the magnetic member to an S polarity repelled by the S pole and attracted to the N pole and held by stopping the DC current for the normal photographing mode.

5 Claims, 2 Drawing Sheets

CAMERA MODULE

BACKGROUND OF THE INVENTION

1. Field of the Invention

This invention relates to a camera module, and more specifically to a camera module that can be used in relatively small-sized electronic apparatuses such as digital cameras, camera-equipped cellular phones and the like.

2. Description of the Related Art

A camera module having a macro switching function is used in relatively small-sized digital cameras, camera-equipped cellular phones and the like. The macro switching function is a function of the camera module that makes it possible to switch a photographing mode of the camera module between a normal photographing mode and a macro photographing mode. In more detail, such a camera module includes a hand-manipulated lever, and a holder having at least one lens which constitutes an optical system of the camera module. The camera module is configured so that the holder can be mechanically displaced in a direction of an optical axis of the lens between a position that is close to an imaging element (image pick-up device) and a position that is far away from the imaging element by manipulating the hand-manipulated lever. The former position of the lens holder corresponds to the normal photographing mode and the latter position of the lens holder corresponds to the macro photographing mode.

As described above, the conventional camera module having a macro switching function requires to have a hand-manipulated lever for carrying out the macro switching function. Therefore, the conventional camera module involves a problem in that when an excessive force is applied to the lever, there is a case that the lever is damaged.

SUMMARY OF THE INVENTION

The present invention has been made in view of the problem described above, and therefore it is an object of the present invention is to provide a camera module having a macro switching function which can be switched between a normal photographing mode and a macro photographing mode without using any hand-manipulated lever as described above.

In order to achieve the object, the present invention is directed to a camera module, comprising:

a lens unit which constitutes an optical system of the camera module;

a holder which houses the lens unit and is displaceable between a first position and a second position along an optical axis direction of the lens unit, the holder having a cylindrical portion;

a magnetic member provided on an outer periphery of the cylindrical portion of the holder;

a coil provided on the outer periphery of the cylindrical portion of the holder at a position close to or adjacent to the magnetic member for magnetizing the magnetic member;

a first magnet having one pole and provided inside the housing so that the one pole of the first magnet faces the magnetic member when the holder is in the first position;

a second magnet which is a different magnet from the first magnet, the second magnet having the other which is opposite to the one pole of the first magnet and provided inside the housing so that the other pole faces the magnetic member when the holder is in the second position; and an imaging element provided below the lens unit.

The camera module is configured so that: (1) when in a state that the holder is in the first position a positive or negative DC is supplied to the coil to generate a magnetic field in the coil to thereby magnetize the magnetic member to have a polarity that is repelled to the one pole of the first magnet but attracted to the other pole of the second magnet, the holder is displaced to the second position from the first position along the optical axis direction; (2) when the supply of the DC to the coil is stopped after the holder has been displaced to the second position, the holder is held at the second position due to the magnetic member being attracted by the magnetic force of the second magnet; (3) when in the state that the holder is in the second position a negative or positive DC is supplied to the coil to generate a magnetic field in the coil to thereby magnetize the magnetic member to have the opposite polarity that is repelled to the other pole of the second magnet but attracted to the one pole of the first magnet, the holder is displaced to the first position from the second position along the optical axis direction; and (4) when the supply of the DC to the coil is stopped after the holder has been displaced to the second position, the holder is held at the first position due to the magnetic member being attracted by the magnetic force of the first magnet.

According to the camera module described above, since it is not necessary to provide any hand-manipulated lever for displaying the holder between the first position (normal photographing mode) and the second position (macro photographing mode), it is possible to avoid such a trouble that the lever is damaged. Further, it is also possible to save a consumed electrical power necessary to the switching operation for displacing the holder between the first position and the second position since it is no longer necessary to continuously supply an electrical current for holding the holder at either of the first or second position of the holder after the holder has been displaced to either of the first or second position.

In the camera module of the present invention, it is preferred that the first position of the holder is a position that the holder is displaced to the side close to the imaging element and the second position is a position that the holder is displaced to the opposite side far from the imaging element. In this case, it is also preferred that the camera module is configured so as to take a normal photographing mode at the first position and a macro photographing mode at the second position.

According to the camera module of the present invention, it is possible to switch the camera module between the normal photographing mode and the macro photographing mode without using any hand-manipulated lever.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENT

A camera module 1 according to an embodiment of the present invention will be described below with reference to the accompanying drawings.

Figure 1:
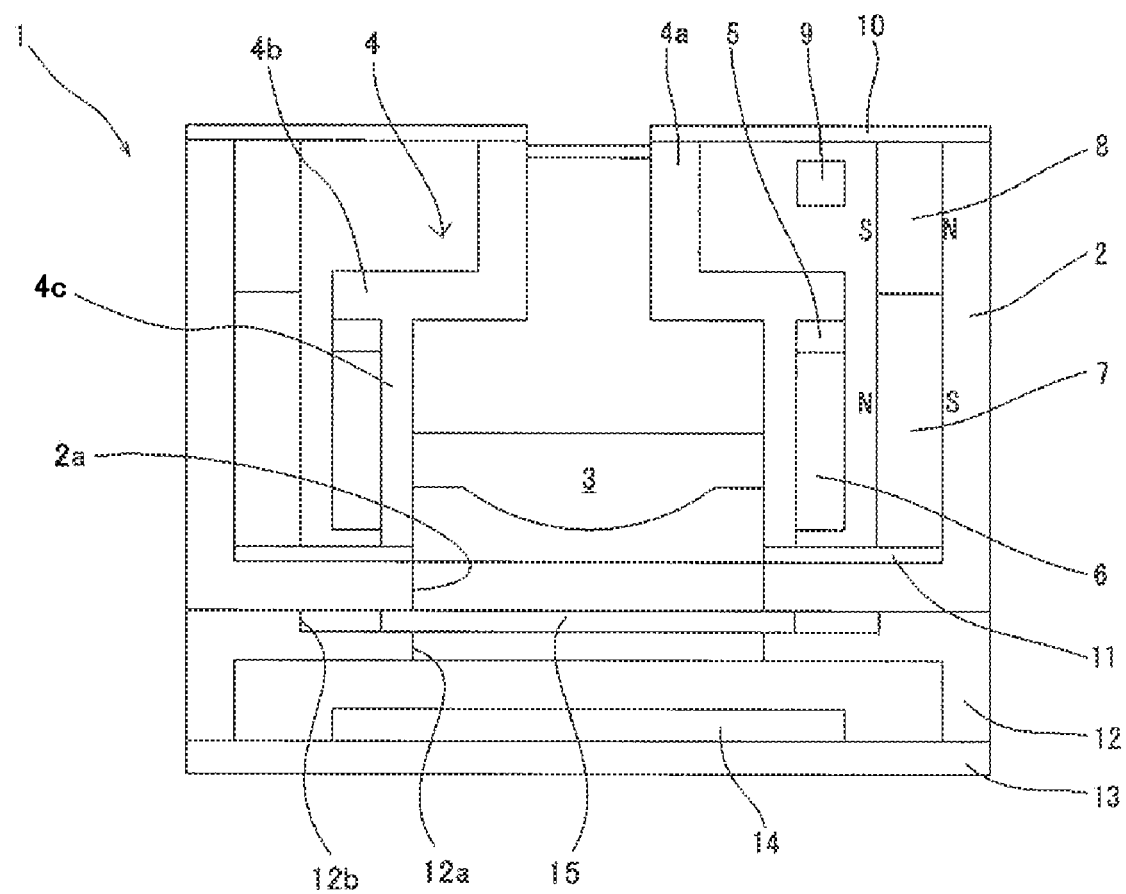
FIG. 1 is a cross-sectional view which schematically shows a normal photographing mode of a camera module according to an embodiment of the present invention.
Figure 2:
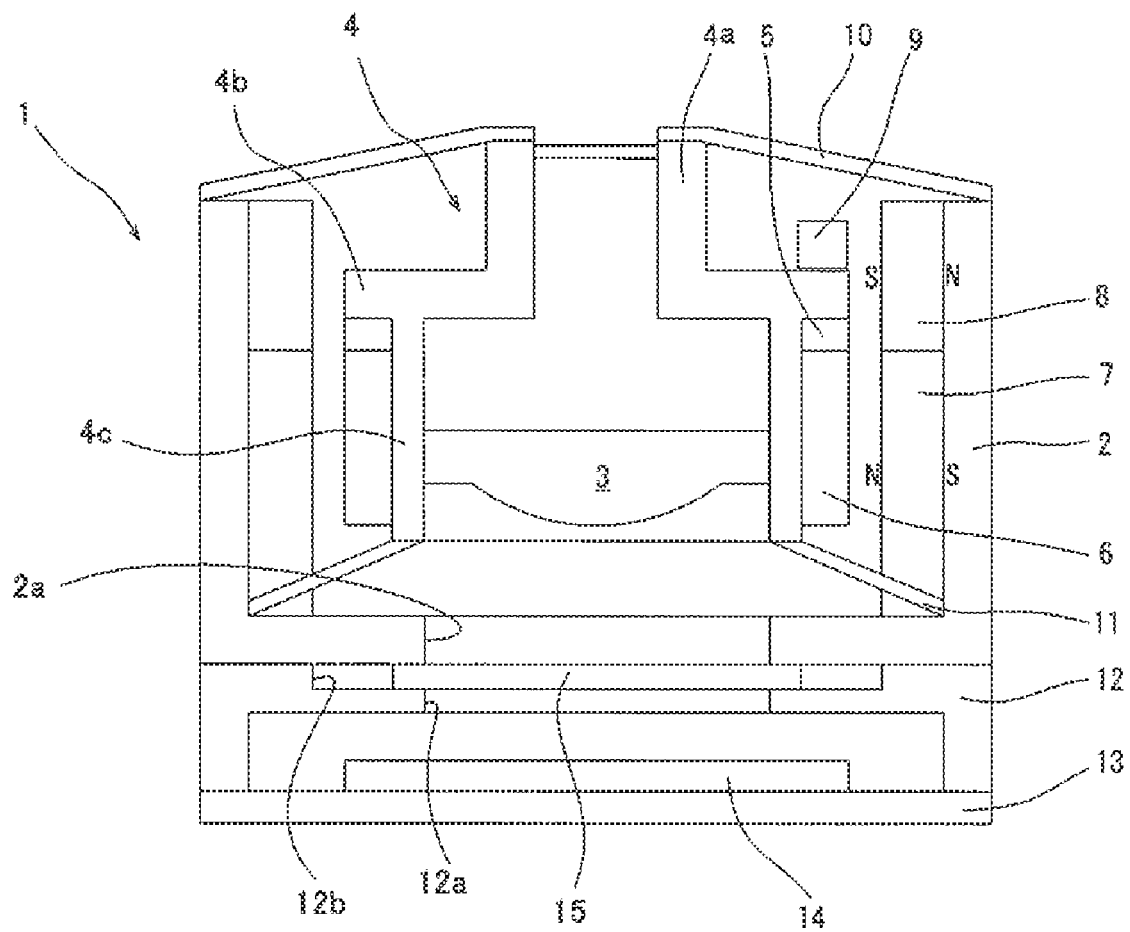
FIG. 2 is a cross-sectional view which schematically shows a state that a holder of the camera module shown in FIG. 1 is in its second position (that is, a macro photographing mode).

In the drawings, FIG. 1 is a cross-sectional view which schematically shows a normal photographing mode of a camera module 1 according to an embodiment of the present invention, and FIG. 2 is a cross-sectional view which schematically shows a state that a holder of the camera module 1 shown in FIG. 1 is in its second position (that is, a macro photographing mode). In this regard, it is to be noted that in the following description the terms "upper" and "lower" are used to denote a direction that an upper leaf spring 10 is disposed as "upper" and a direction that a substrate 13 is disposed as "lower", respectively.

The camera module 1 includes a housing 2, a lens unit 3 which constitute an optical system of the camera module 1, a holder 4 which houses the lens unit 3 and is displaceable between a first position and a second position along an optical axis direction of the lens unit 3, a magnetic member 5 provided on the holder 4, a coil 6 provided on the holder 4 adjacent to the magnetic member 5 for magnetizing the magnetic member 5, a first magnet 7 provided inside the housing 2 and having an one pole (N pole) which faces the magnetic member 5 at the first position of the holder 4, a second magnet 8 provided inside the housing 2 and having the other pole (S pole) which faces the magnetic member 5 at the second position of the holder 4, and an imaging element 14 which is provided blow the housing 2.

The camera module having the above structure is operated as follows: (1) when in a state that the holder 4 is in the first position a positive DC is supplied to the coil 6 to generate a magnetic field in the coil 6 to thereby magnetize the magnetic member 5 to have one polarity (N pole), the magnetic member 5 is repelled to the one pole of the first magnet 7 while being attracted to the other pole (S pole) of the second magnet 8, thereby the holder 4 is displaced to the second position from the first position along the optical axis direction; (2) when the supply of the DC to the coil 6 is stopped after the holder has been displaced to the second position, the holder 4 is held at the second position due to the magnetic member 5 being attracted to the second magnet 7 by the magnetic force thereof; (3) when in the state that the holder is in the second position a negative DC is supplied to the coil 6 to generate a magnetic field in the coil 6 to thereby magnetize the magnetic member 5 to have the opposite polarity (S pole), the magnetic member 5 is repelled to the other pole of the second magnet 8 while being attracted to the one pole (N pole) of the first magnet 7, thereby the holder 4 is displaced to the first position from the second position along the optical axis direction; and (4) in the state (3) when the supply of the DC to the coil 6 is stopped, the holder 4 is held at the first position due to the magnetic member 5 being attracted to the first magnet 7 by the magnetic force thereof.

In more detail, the housing 2 is a roughly cylindrical member, and inside thereof the first magnet 7 and the second magnet 8 are provided (which will be described later in more detail). As shown in FIG. 1 and FIG. 2, the first magnet 7 is disposed below the second magnet 8. Further, in the bottom surface of the housing 2, there is formed an opening 2a for introducing light entered from the outside through the lens 3 to the imaging element 14. Furthermore, inside the housing 2, a stopper 9 is also provided (which will be described later in more detail).

The holder 4 is also a roughly cylindrical shape member made of a synthetic resin material, and has a hollow cylindrical space therein. More specifically, the holder 4 is comprised of an upper cylindrical small diameter portion 4a, a flange portion 4b integrally provided on the lower end of the upper cylindrical small diameter portion 4a, and a lower cylindrical large diameter portion 4c integrally provided on the bottom surface of the flange portion 4b. The diameter of the lower cylindrical large diameter portion 4c is larger than that of the upper cylindrical small diameter portion 4a but smaller than that of the flange portion 4b. This means that the upper end of the lower cylindrical large diameter portion 4c is coupled to the bottom surface of the flange portion 4b at a position inside the outer circumference of the flange portion 4b so that a circumferential space is defined around the outer periphery surface of the lower cylindrical large diameter portion 4c by the outer periphery surface of the lower cylindrical large diameter portion 4c and a part of the bottom surface of the flange portion 4b which outwardly extends over the outer periphery surface of the lower cylindrical large diameter portion 4c.

In the hollow cylindrical space of the holder 4, that is, in the hollow cylindrical space of the lower cylindrical large diameter portion 4c, there is provided the lens unit 3 including a convex lens which constitutes an optical system of the camera module 1. As described above, the holder 4 is constructed so as to be displaceable between the first position shown in FIG. 1 and the second position shown in FIG. 2 along the optical axis direction of the lens unit 3. The first position of the holder 4 shown in FIG. 1 takes a normal photographing mode of the camera module, and the second position of the holder 4 shown in FIG. 2 takes a macro photographing mode thereof.

On the outer peripheral portion of the holder 4, there are provided the magnetic member 5 and the coil 6. The coil 6 is provided below the magnetic member 5 so that they are accommodated in the circumferential space defined by the outer periphery surface of the lower cylindrical large diameter portion 4c and a part of the bottom surface of the flange portion 4b which outwardly extends over the outer periphery surface of the lower cylindrical large diameter portion 4c.

The holder 4 is displaceably supported by the housing 2 by means of an upper leaf spring 10 and a lower leaf spring 11. Each of the upper and lower leaf springs 10 and 11 includes an outer annular portion, an inner annular portion concentrically provided inside the outer annular portion through an annular spacing therebetween, and a plurality of bridge portions provided in the annular spacing so as to couple an inner peripheral edge of the outer annular portion and an outer peripheral edge of the inner annular portion (not shown in the drawings). Each of the bridge portions has an elongated arc-shape so that it extends along the inner periphery of the outer annular portion and the outer periphery of the inner annular portion through a predetermined angle. One example of such a leaf spring is disclosed in U.S. Pat. No. 7,271,511 owned by the assignee of this patent application, and the contents of the disclosure of the patent is incorporated herein by reference.

The inner annular portion of the upper leaf spring 10 is attached to the upper cylindrical end of the holder 4 (that is, the upper cylindrical end of the upper cylindrical small diameter portion 4a), and the outer annular portion of the upper leaf spring 10 is attached to the upper cylindrical end of the housing 2. Likewise, the inner annular portion of the lower spring 11 is attached to the lower cylindrical end of the holder 4 (that is, the lower cylindrical end of the lower cylindrical large diameter portion 4c), and the outer annular portion of the lower leaf spring 10 is bonded to a bottom portion of the housing 2

By the resiliently deformation of the bridge portions of each of the upper and lower leaf springs 10 and 11, the holder 4 can be displaced between the first position and the second position along the optical axis direction of the lens unit 3.

The magnetic member 5 is a ring-shaped member made of iron or the like, and it is fitted and attached to the outer periphery of the lower cylindrical large diameter portion 4c the holder 4. Further, the coil 6 is a ring-shaped coil obtained by winding a wire around the lower cylindrical large diameter portion 4c to form a ring-shaped form and it is positioned blow the magnetic member 5 adjacent to or in contact with the magnetic member 5. In this embodiment, when a positive DC is supplied to the coil 6 to generate a magnetic field in the coil 6, the magnetic member 5 is adapted to be magnetized to have an N polarity (N pole). On the other hand, when a negative DC is supplied to the coil 6 to generate a magnetic field in the coil 6, the magnetic member 5 is adapted to be magnetized to have an S polarity (S pole).

The first magnet 7 is a permanent magnet having a cylindrical shape and arranged inside the housing 2 through a predetermined spacing with respect to the magnetic member 5 and the coil 6, and it is magnetized so that the inner side thereof which faces the magnetic member 5 at the first position of the holder 4 is N pole whereas the outer side thereof which faces the inner surface of the housing 2 is S pole. Further, likewise the first magnet 7, the second magnet 8 is also a permanent magnet having a cylindrical shape and arranged inside the housing 2 through a predetermined spacing with respect to the magnetic member 5 and the coil 6, and it is magnetized so that the inner side thereof which faces the magnetic member 5 at the second position of the holder 4 is S pole whereas the outer side thereof which faces the inner surface of the housing 2 is N pole. As shown in FIG. 1 and FIG. 2, the first magnet 7 is arranged just below the second magnet 8 in contact with each other.

Further, a base 12 which has a flattened box shape of which lower side is opened, that is, the base 12 is comprised of the side wall portions and an upper plate portion. Further, on the upper plate portion of the base 12, there is formed a concave portion 12b and inside the concave portion 12b there is formed an opening 12a for introducing the light entered through the opening 2a to the imaging element 14. Furthermore, in the concave portion 12b of the base 12, there is provided an IR filter 15.

On the lower end of the side wall portions of the base 12, a substrate 13 is attached so that an air-tight space is defined in the base 12 by the substrate 13, the base 12 and the IR filter 15. The imaging element 14 is mounted on the substrate 14 within the air-tight space.

Hereinbelow, an operation of the camera module of the above-described embodiment will be explained.

As described above, FIG. 1 shows the camera module 1 in the normal photographing mode thereof. In this normal photographing mode of the camera module 1, no DC is supplied to the coil 6 and therefore the magnetic member 5 is attracted to the magnetic force of the first magnet 7 so that the holder 4 is in the first position.

Next, a description will be made with regard to the process of displacing the holder 4 from the first position to the second position for taking the macro photographing mode of the camera module 1. In the state shown in FIG. 1, when a positive DC is supplied to the coil 6 by operating any switch (not shown in the drawings) to generate a magnetic field in the coil 6, the magnetic member 5 is magnetized to have an N polarity at the first position of the holder 43. The magnetic member 5 which has been magnetized to have the N polarity at the first position of the holder 4 is repelled to the N pole of the first magnet 7 while being attracted to the S pole of the second magnet 8. Therefore, the holder 4 is displaced to the second position shown in FIG. 2 from the first position along the optical axis direction. When the holder 4 has been displaced to the second position, the supply of the positive DC to the coil 6 is stopped. However, even when the supply of the positive DC to the coil 6 is stopped, the magnetic member 5 looses its magnetic characteristic and backs to its original state (a mere magnetic member). Therefore, the magnetic member 5 is being attracted by the magnetic force of the second magnet 7, and thus the holder 4 is being held at its second position (macro photographing mode). In this regard, it is to be noted that when the holder is displaced from the first position to the second position, the holder 4 abuts on the stopper 9 provided inside the housing 2, and thus the displaced position of the holder 4 is regulated so that the holder 4 is accurately held at the second position. Since the holder 4 is held at the second position in this way, the camera module 1 can take the macro photographing mode reliably.

Next, a description will be made with regard to the process of displacing the holder 4 from the second position for taking the macro photographing mode to the first position for taking the normal photographing mode of the camera module 1.

In the state that the holder 4 is in the second position shown in FIG. 2, when a negative DC is supplied to the coil 6 to generate a magnetic field in the coil 6, the magnetic member 5 is magnetized to have an S polarity at the second position. The magnetic member 5 which has been magnetized to have the S polarity at the second position of the holder 4 is repelled to the S pole of the second magnet 8 while being attracted to the N pole of the first magnet 7. Therefore, the holder 4 is displaced to the first position shown in FIG. 1 from the second position along the optical axis direction. However, even when the supply of the positive DC to the coil 6 is stopped, the magnetic member 5 looses its magnetic characteristic and backs to its original state (that is, a mere magnetic member). Therefore, the magnetic member 5 is being attracted by the magnetic force of the second magnet 7, and thus the holder 4 is being held at its second position (macro photographing mode).

As described above, since in the camera module of this embodiment it is not necessary to provide any hand-manipulated lever for displaying the holder between the normal photographing mode and the macro photographing mode, it is possible to avoid such a trouble that the lever is damaged. Further, it is also possible to save a consumed electrical power necessary to the switching operation since it is no longer necessary to continuously supply an electrical current for holding the holder 4 at either of the first or second position of the holder 4 after the holder 4 has been displaced to either of the first or second position.

Further, according to the camera module of this embodiment, the first position of the holder 4 is a position that the holder 4 is displaced on the side close to the imaging element 14 and the second position of the holder 4 is a position that the holder 4 is displaced on the side far from the imaging element 14. Therefore, according to this camera module, it is possible to switch the camera module between the normal photographing mode and the macro photographing mode without using any hand-manipulated lever.

In this regard, it is to be noted that the present invention can be applied to a camera module that has a switching function between a normal photographing mode and a zooming photographing mode.

Further, it should be understood that the present invention is not limited to the preferred embodiment described hereinabove and, needless to say, a variety of modifications or variations may be made without departing from the scope of the invention defined in the following claims.

For example, the arrangement of the S pole and the N pole of each of the first and second magnets 7 and 8 may be reversed. In such case, the direction of the DC to be supplied to the coil 6 is also reversed.

Further, the shapes of the magnetic member 5, the first magnet 7 and the second magnet 8 are not limited to the ring-shape as described above. They may be formed from two or more segmented pieces.

Finally, it is also to be understood that the present disclosure relates to subject matter contained in Japanese Patent Application No. 2007-014336 (filed on Jan. 24, 2007) which is expressly incorporated herein by reference in its entirety.

What is claimed is:

1. A camera module, comprising:
   a housing;
   a lens unit which constitutes an optical system of the camera module;
   a holder which houses the lens unit and is displaceable between a first position and a second position along an optical axis direction of the lens unit, the holder having an outer peripheral cylindrical portion;
   a magnetic member provided on the outer peripheral cylindrical portion of the holder;
   a coil provided on the outer peripheral cylindrical portion of the holder at a position close to or adjacent to the magnetic member for magnetizing the magnetic member;
   a first magnet having one pole, having a cylindrical shape and provided inside the housing so that the one pole of the first magnet faces the magnetic member when the holder is in the first position;
   a second magnet which is a different magnet from the first magnet, the second magnet having the other pole which is opposite to the one pole of the first magnet, having a cylindrical shape and provided inside the housing so that the other pole faces the magnetic member when the holder is in the second position, the second magnet provided along the optical axis direction of the lens unit so as to be in contact with the first magnet; and
   an imaging element provided below the lens unit;
   wherein the holder with the lens unit, the magnetic member and the coil are positioned radially inside the first and second magnets and displaceable axially through a predetermined spacing with respect to the first and second magnets, and
   wherein the camera module is configured so that: (1) when in a state that the holder is in the first position a positive or negative DC is supplied to the coil to generate a magnetic field in the coil to thereby magnetize the magnetic member to have a polarity that is repelled to the one pole of the first magnet but attracted to the other pole of the second magnet, the holder is displaced to the second position from the first position along the optical axis direction; (2) when the supply of the DC to the coil is stopped after the holder has been displaced to the second position, the holder is held at the second position due to the magnetic member being attracted by the magnetic force of the second magnet; (3) when in the state that the holder is in the second position a negative or positive DC is supplied to the coil to generate a magnetic field in the coil to thereby magnetize the magnetic member to have the opposite polarity that is repelled to the other pole of the second magnet but attracted to the one pole of the first magnet, the holder is displaced to the first position from the second position along the optical axis direction; and (4) when the supply of the DC to the coil is stopped after the holder has been displaced to the second position, the holder is held at the first position due to the magnetic member being attracted by the magnetic force of the first magnet.

2. The camera module as claimed in claim 1, wherein the first position of the holder is a position that the holder is displaced to the side close to the imaging element and the second position is a position that the holder is displaced to the opposite side far from the imaging element.

3. The camera module as claimed in claim 2, wherein the camera module is configured so as to take a normal photographing mode at the first position and a macro photographing mode at the second position.

4. The camera module as claimed in claim 1, wherein the holder is displaceably supported by the housing by an upper leaf spring and a lower leaf spring.

5. The camera module as claimed in claim 1, wherein the coil and the magnetic member are positioned around the outer peripheral cylindrical portion of the holder with the coil below the magnetic member in the optical axis direction and radially inward of the first and second magnets.

* * * * *